June 9, 1953 C. R. TURNER ET AL 2,641,680
COOKING APPARATUS
Filed Oct. 2, 1947 4 Sheets-Sheet 1

Inventors —
Charles Roger Turner &
Paul Garfield Turner
by their Attorneys
Howson & Howson June 9, 1953　　C. R. TURNER ET AL　　2,641,680
COOKING APPARATUS Filed Oct. 2, 1947　　4 Sheets-Sheet 3

Inventors ÷
Charles Roger Turner &
Paul Garfield Turner
by their Attorneys
Howson & Howson June 9, 1953

C. R. TURNER ET AL

2,641,680

COOKING APPARATUS

Filed Oct. 2, 1947

Inventors :—
Charles Roger Turner &
Paul Garfield Turner
by their Attorneys
Howson & Howson Patented June 9, 1953

2,641,680

UNITED STATES PATENT OFFICE 2,641,680

COOKING APPARATUS

Charles Roger Turner and Paul Garfield Turner, Enfield, Springfield Township, Montgomery County, Pa., assignors to Proctor Electric Company, Philadelphia, Pa., a corporation of Pennsylvania Application October 2, 1947, Serial No. 777,496

30 Claims. (Cl. 219—43)

This invention relates primarily to the automatic control of a pressure cooker. In a broader sense, the invention also relates to time control of a heating operation such as a cooking operation.

With the widespread use of pressure cooking devices and their acceptance by housewives as a standard item of kitchen equipment, it has become desirable to incorporate in these cooking devices certain automatic features. The most popular feature of pressure cookers has been the speed with which these cookers can completely and satisfactorily cook meats and vegetables. However, when cooking is done at such pressures and temperatures as are obtained with these devices, it has been found that certain cuts of meat and types of vegetables are quite critical in regard to the length of time which is required to prepare them for the table. For example, peas are quite prone to become unappetizing pastes rather than tasteful delicacies when cooked too long in a pressure cooker. Similarly, vegetables such as asparagus and broccoli are reduced to their main fibres with almost total disintegration of the stalk. Satisfactory use of a pressure cooker, therefore, requires very accurate control of the cooking time.

With the foregoing in mind, the principal object of this invention is to provide for a pressure cooker, means to accurately time the duration of the cooking period.

Further, it has been found that the time required for the pressure in the cooker to rise to the proper cooking pressure, after the cooker has been placed on an energized heating element, is variable and is dependent on the amount of water and the quantity of food therein. The variable time during which the temperature and pressure are rising to the predetermined cooking pressure has been found to be, in most instances, a portion of the total cooking time. For example, cooking fresh garden peas at elevated temperatures corresponding to a pressure of 15 p. s. i., gauge, requires only one or two minutes. However, since it may require as much as eight minutes to cook peas by boiling in an open pot, it is obvious that some degree of cooking is accomplished during the time the pressure is rising from atmospheric pressure to a pressure of 15 p. s. i. Furthermore, some degree of cooking is accomplished during the time the pressure is being reduced at the end of the cooking operation. In the apparatus provided by the present invention, these portions of the total cooking time are included in the timed cooking period by initiating such period at a pressure lower than the predetermined cooking pressure.

It is a further object of this invention to provide, in an automatic pressure cooker, novel means to initiate a timed cooking period upon the attainment of a pressure in the cooker which is less than the predetermined full cooking pressure.

It is well known that the heat input required to maintain cooking pressure in a pressure cooker is considerably less than that heat input required to quickly and initially raise the contents of the cooker to the cooking pressure. Where pressure cookers are used in connection with the surface heating elements of a gas or electric range, an excess of heat is supplied to the cooker after the cooking pressure is obtained. This is evidenced by the continual exhaust of steam through the safety valves and the rapid lifting and dropping of the pressure control weights. To cook economically therefore, a close watch must be kept on the cooker, and the heat input should be reduced as the pressure reaches the predetermined cooking value. To keep this watch requires that the housewife divert her attention from other pressing tasks such as are necessary in the preparation of a meal. Then too, there exists the possibility of steaming off all the water in the vessel, as home economists and others whose studies of cooking and foods qualify them as authorities advise that pressure cooking be done with a minimum of water. This is advised because there is less loss of food value in the leaching out of the contents of the cooker when a minimum of water is present. A further danger which arises when the water is boiled away is the possible overheating and burning out of the bottom of the cooking vessel.

It is not only desirable to reduce the heat input during the cooking operation, but it has been found especially advantageous to effect a reduction in the heat input at some pressure less than the full cooking pressure. In this way it is possible to counteract the inherent "overshoot" of temperature and pressure which would otherwise occur in such apparatus during the heating-up period.

It is a further object of this invention to provide means, in an automatic pressure cooker, to reduce the heat input to the pressure cooker upon attainment of some pressure less than the full cooking pressure, the reduced heat input being such to maintain the cooking pressure for the duration of the cooking period.

Certain prior pressure cookers having chronometric means for interrupting or stopping the current to a heating element have not been completely satisfactory because of the length of time which is required for the pressure to drop so that the lid may be safely removed. That this cooling time is a portion of the total cooking time may be easily understood when it is considered that, during the reduction of pressure, the contents of the cooker are at temperatures at which cooking is accomplished. Some manufacturers of non-automatic pressure cookers have taken cognizance of this problem in their instructions for proper use of their products. These manufacturers advise that to quickly reduce the pressure in a cooker, the cooker be held beneath the faucet of running cold water. Other manufacturers of pressure cookers have considered this problem and have provided means for venting the pressure in the vessel after the cooking period is ended. This venting has been accomplished by removing a needle valve weight from a small orifice in the cover, as is well known, or by otherwise providing communication between the interior of the vessel and the atmosphere.

It is a further object of this invention to provide improved automatic means to rapidly vent the pressure within a pressure cooker upon termination of a predetermined cooking period.

A further object of this invention is to provide novel means, in an automatic pressure cooker, to reduce the pressure in the cooker substantially synchronously with the termination of the timed cooking period.

In automatic pressure reduction of pressure cookers, it has been found that venting must be quick because the time during which the vessel is venting adds to the cooking time. With foods having short cooking time, there exists the danger of overcooking if the period of venting is long and this is accompanied by the previously mentioned deterioration. Venting that is too fast has an equally undesirable effect in that with certain types of vegetables, the moisture within the vegetables as a result of a sudden decrease in pressure unaccompanied by a corresponding decrease in total heat, can turn to steam, reducing the solid vegetable to a pulpy and puffed mass. In certain viscous liquids, such as creamed soups or heavy broths, excessively rapid venting causes frothing of the liquid to the extent of filling the cooker and being ejected with great force from the vent orifice, to the discomfort and annoyance of the operator. Experiment has shown that there is an optimum safe rate at which pressure cookers should be vented, and that this rate should be held constant at all pressures.

Further objects of this invention are to provide means in an automatic pressure cooker, to insure venting at an optimum safe rate and to provide means for venting at an optimum safe rate which is substantially constant over the entire pressure range.

A further object of this invention is to provide means in an automatic pressure cooker, to automatically vent a pressure cooker at a safe optimum rate substantially synchronously with the termination of the energization of the heating means and at the completion of a predetermined cooking period.

A further object of this invention is to provide means to vent an automatic pressure cooker at a substantially constant rate, irrespective of the pressure drop.

A further object of the invention is to direct and diffuse the vented steam in a manner to accomplish certain desirable results.

Other objects and features of the invention will be apparent from the following detailed description.

In the accompanying drawings.

Figures 1, 4, 5, 6:
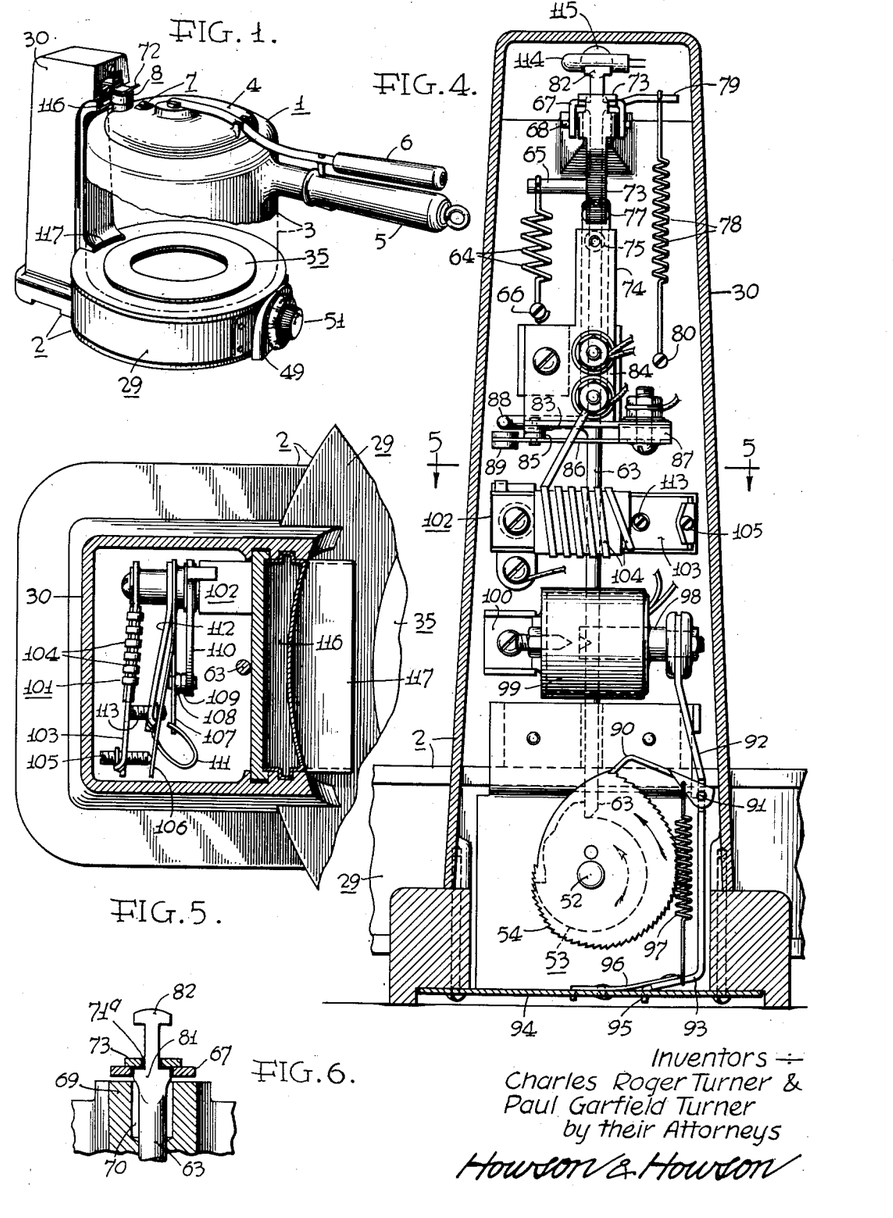
Fig. 1 is a perspective view showing one form of apparatus according to the invention, comprising a control mechanism and a pressure cooker which are separable but adapted to be brought into cooperative relation with one another.
Fig. 4 is a sectional view taken at the rear of the control mechanism and showing certain elements thereof more clearly.
Fig. 5 is a sectional view taken along line 5—5 of Fig. 4.
Fig. 6 is a detail sectional view taken along line 6—6 of Fig. 2.
Figures 2, 3:
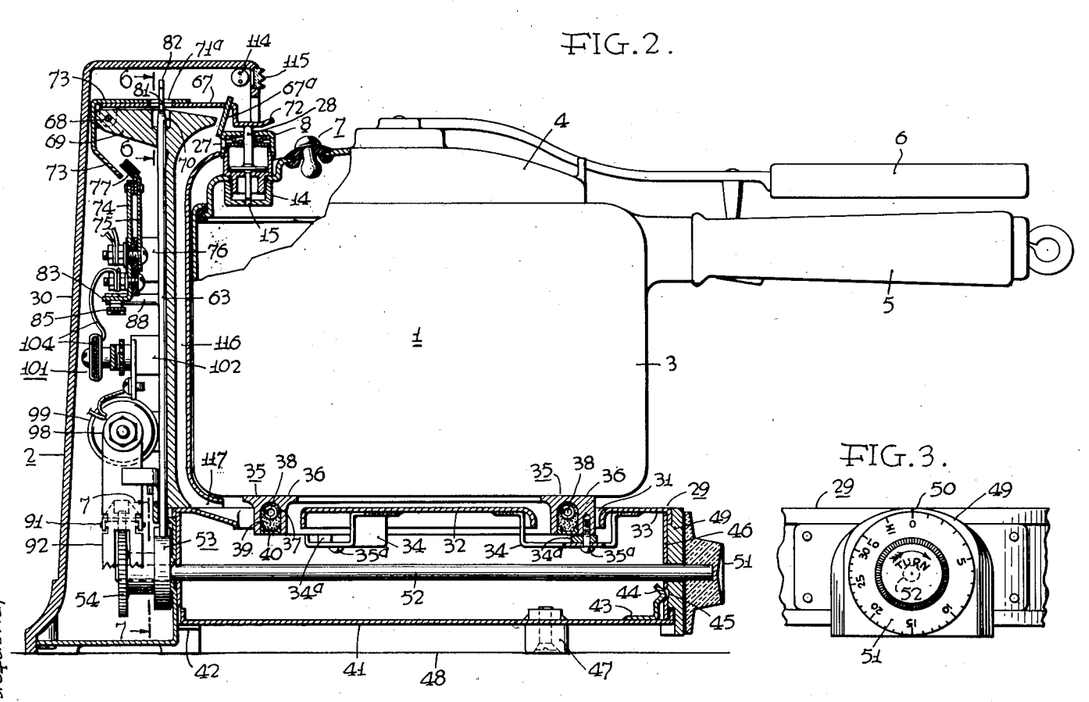
Fig. 2 is a larger scale view showing the control mechanism in section and also showing a portion of the pressure cooker in section.
Fig. 3 is a face view of the control knob.
Figure 8:
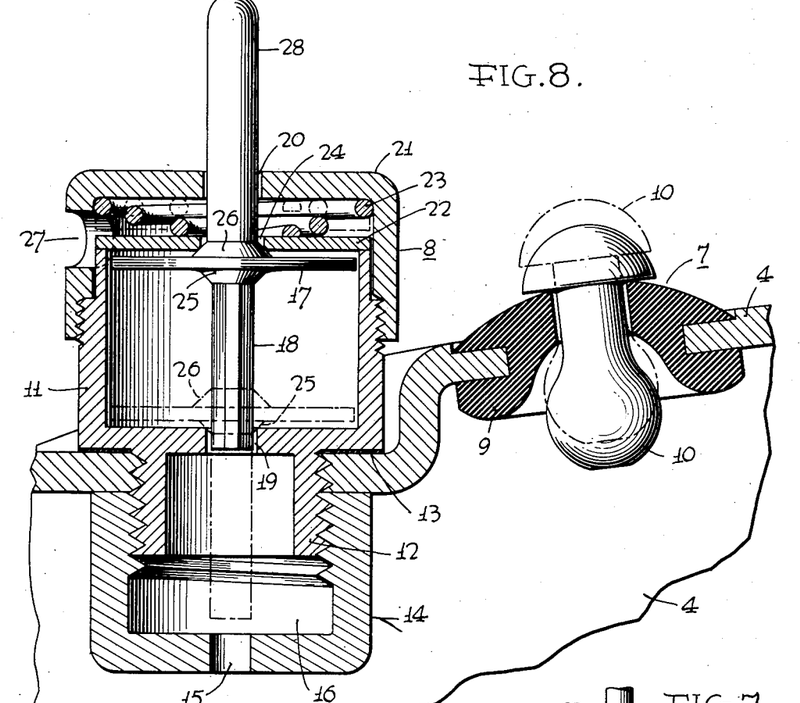
Fig. 8 is a fragmentary sectional view on a relatively large scale of a portion of the pressure cooker lid and certain elements thereon.

As shown in Figs. 1 and 2, apparatus provided according to the present invention may comprise a pressure cooker 1 and a control mechanism 2 with which the pressure cooker is adapted to be associated, as hereinafter more fully described. The pressure cooker 1 comprises a vessel 3 and a lid 4 having coacting handles 5 and 6. The general construction of the pressure cooker may be similar to that disclosed in U. S. Patent No. 2,570,993, issued October 9, 1951, to C. R. Turner. On the lid of the pressure cooker there is provided an air-venting device 7 of the character disclosed and claimed in U. S. Patent No. 2,619,982, issued December 2, 1952, to C. R. Turner, and there is also provided a pressure-operable valve 8 which is specially constructed to perform certain functions according to the present invention as hereinafter described. The valve per se is the subject of divisional application Serial No. 263,949, filed November 14, 1951. As shown in Fig. 8 the venting device 7 comprises a resilient member 9 held in an opening in the lid 4 and a venting member 10 loosely carried within an opening in the resilient member 9. As described in U. S. Patent No. 2,619,982, the air venting device serves to vent air from the cooker during the initial heating period and it also serves as a means to indicate whether the pressure within the cooker is at a low value, thus apprising the user that the lid may be safely removed. In operation, the venting member 10 rises under increasing pressure within the cooker, permitting the air to escape through the opening in the resilient member 9 and when the air has been vented and a substantial pressure has built up in the cooker, the venting member rises to its uppermost position and seals the opening in the resilient member 9. At the end of the cooking operation, reduction of pressure within the cooker causes the venting member to drop, thus indicating to the user that it is safe to remove the lid.

The construction of the valve 8 is also clearly shown in Fig. 8. The valve casing 11 is secured to the lid of the cooker by means of the threaded portion 12, a tight seal being effected by means of a rubber gasket 13. A lower cap 14 is threadedly secured to the extending portion 12 of the main casing, and it has an opening 15 to admit pressure into the lower valve compartment 16. A piston 17 is carried by the valve stem 18 which is vertically movable in the valve casing. The lower end of the stem 18 is loosely disposed in an opening 19 at the bottom of the main casing 11, while the upper end of the stem is loosely disposed in an opening 20 in the upper cap 21 which is threadedly secured to the casing 11. A plate 22 is freely mounted at the upper end of the casing 11 and is urged downwardly by a spring 23 into abutting relation with the upper end of the casing wall as illustrated. The valve stem extends loosely through an opening 24 in said plate. The valve stem and piston assembly is provided with tapered surfaces or shoulders 25 and 26 which are adapted to cooperate with the edges of openings 19 and 24. The upper cap 21 is provided with a steam emission opening 27. Normally the valve stem and piston are in the lower position shown in dot-and-dash outline, but when the pressure within the cooker rises, the piston is moved upward as shown in the solid line illustration. It will be noted that the upper portion 28 of the valve stem is of substantial length and is adapted to be projected substantially above the valve body. The purpose of this and the operation of the valve will be described later.

Referring now to the control mechanism 2 (Figs. 1 and 2), this mechanism comprises a hollow circular base 29 and a hollow upright column 30 at the rear of said base. The top of the base 29 is formed so as to provide an annular opening 31, the central portion 32 being supported by the outer portion 33 by means of suitable brackets 34.

A heater ring 35 is mounted in the annular opening. The heater ring comprises a metal ring 36 having a recess 37 within which a heating coil 38 is disposed, the coil being embedded in ceramic material 39 and being held in place by an annular ring 40. Such construction is commonly employed in the heating elements of electrical appliances and requires no further description. The heater ring 35 is supported on brackets 34 by means of spacers 34a and screws 35a, each screw extending through an opening in the associated bracket and through the associated spacer and threadedly engaging a boss portion formed on the metal ring 36.

The bottom 41 of the hollow base 29 is removably supported by means of a shoulder 42 and a spring clip 43 which is welded to the bottom at the front thereof. When the bottom is in place, the bent portion 44 of the clip 43 enters a recess or aperture 45 in the cylindrical wall 46. The bottom 41 carries a plurality of feet 47 which are adapted to rest on a supporting surface such as shown at 48 in Fig. 2.

At the front portion of the hollow base 29 there is provided a plate 49 (see Fig. 3) having an index mark thereon 50 in cooperation with a rotatable knob 51 which is mounted on the front end of a rotatable shaft 52 extending through the hollow base and into the hollow upright column 30. The knob 51 has markings on the front face thereof as shown in Fig. 3, the numerical markings serving to indicate different cooking periods. The purpose of the other markings will be apparent later.

On the rear end of the shaft 52, there is a cam 53 and a ratchet member 54, these elements being disposed in the lower portion of the hollow column 30. The cam 53 has the form shown in Fig. 7, having a shoulder 55, a flat 56, a rise 57, a second flat 58, a second rise 59, a third flat 60, a shoulder 61, and a circular portion 62. A vertical rod 63, slidably mounted within the column 30, has its lower end in engagement with the cam 53 and is urged downwardly by the spring 64 (Fig. 4), the upper end of which is secured to an arm 65 on said rod, while the lower end of the spring is fixedly secured at 66. The rod 63 is movable upwardly and downwardly by the conjoint action of the cam 53 and the spring 64, as described hereinafter. Its purpose is to control certain switches and also to effect venting of the pressure cooker through the valve 8 upon completion of a cooking operation. At the upper part of the hollow column 30, there are provided two coacting levers, 67, 73 (Figs. 2 and 10), which are pivotedly mounted at 68 on a stationary supporting member 69. It will be noted that lever 73 overlies lever 67. A member 67a is loosely carried by lever 67, the purpose of which will appear later. The rod 63 extends through an opening 70 in the supporting member 69 and also through openings 71 and 71a in the levers 67 and 73. At its forward end, the lever 67 has an extending finger 72 adapted to engage the upper portion 28 of the valve stem. At its upper end portion, the rod 63 is provided with shoulders 81, 82 (Fig. 6) which control the levers 67 and 73 as hereinafter described. A switch comprising contact arms 74 and 75 is mounted on an insulating support 76, and arm 75 of said switch carries an insulating button 77 which is engageable by the lower extending portion of the lever 73. The switch contacts are normally engaged, but when the lever 73 is rocked in a counter-clockwise direction (as viewed in Fig. 2) the engagement of the lever 73 with the button 77 opens the contacts. The lever 67 is urged in the opposite direction by the spring 78 (Fig. 4) whose upper end is secured to an arm 79 on said lever and whose lower end is fixedly secured at 80.

The rod 63 also serves to control a switch (Fig. 4) comprising a stationary contact 83 on a bracket 84 and a movable contact 85 carried by a resilient arm 86 secured to a support 87. The rod 63 has a laterally-extending arm 88 which is adapted to engage an insulating button 89 on the end of arm 86 and thus hold the switch contact 85 out of engagement with contact 83 when the rod is in its lowermost position. Upward movement of the rod from said position permits the contacts to close.

Mention has already been made of the ratchet member 54 on the end of shaft 52. Associated with this ratchet member is a pawl or dog 90 pivotally mounted at 91 on a vertically extending element 92. The lower end of said element is bent to form a foot 93 which has a projecting toe inserted in a recess in the bottom plate 94 to form an effective pivotal mounting at 95. A leaf spring 96 has its end portions secured to the bottom plate and to the foot 93 of element 92. A spring 97 extending between the pawl 90 and the foot 93, serves to maintain the nose of the pawl in engagement with the ratchet member 54. The upper end of element 92 is secured to the movable core or armature 98 of solenoid 99 which is mounted on a bracket 100. As will be seen later, the solenoid 99 is intermittently and successively energized to effect step-by-step movement of the ratchet member 54 during the cooking operation. Each time the solenoid is energized, the movable core or armature 98 actuates the pawl through movement of the pawl-supporting element 92.

The solenoid 99 is intermittently and successively energized, as above mentioned, through the operation of a thermal timer 101 which per se is the subject of divisional application Serial No. 263,950, filed November 21, 1951. As shown in Fig. 5 the thermal timer comprises certain elements mounted on a common support 102. A bimetallic member 103 is activated by a small electrical heater 104 which preferably comprises suitable resistance wire wound about the bimetallic element and insulated therefrom. At its free end, the bimetallic element carries a set screw 105 which engages a resilient finger 106. A second resilient finger 107, which is struck out from the finger 106, carries a contact 108 which cooperates with a contact 109 on a stationary rigid arm 110. An over-center spring 111 has its ends secured to fingers 106 and 107 and forms therewith a toggle-like arrangement. A rigid arm 112 carries a set screw 113 which extends freely through finger 106 for engagement by finger 107. The bimetal element 103 has an opening therein to permit adjustment of screw 113 and to enable movement of the bimetal element without engaging said screw.

In operation, the bimetal element 103 flexes toward the right, as viewed in Fig. 5, in response to the heating effect of the heater 104. As the resilient finger 106 is thus moved toward the right, it passes finger 107 and as it does so, the spring 111 effects abrupt movement of contact 108 out of engagement with contact 109 and against screw 113. The opening of the contacts interrupts the current flow through the heater 104, and as the bimetal element 103 cools, it moves in the opposite direction until a reverse toggle-like action takes place causing closure of the switch contacts. The intermittent closure of the contacts effects intermittent energization of the solenoid 99. The adjustment of the set screws 105 and 113 and the purpose of the adjustments will be explained later.

In the upper part of the hollow column 30, there is provided a glow lamp 114 (Fig. 2) which is disposed adjacent a small window 115. The purpose of the lamp is to indicate when the apparatus is energized.

As previously mentioned, one purpose of the rod 63 is to effect venting of the pressure cooker through the valve 8 upon completion of a cooking operation. As may be seen in Fig. 2 a vertical passage 116 extends from the outlet opening 27 of the valve downwardly within the column 30. The outlet 117 of said passage is directed toward the heater ring 35. During venting of the pressure cooker, the passage 116 conveys steam and air downwardly to the outlet 117, as hereinafter described.

Figure 9:
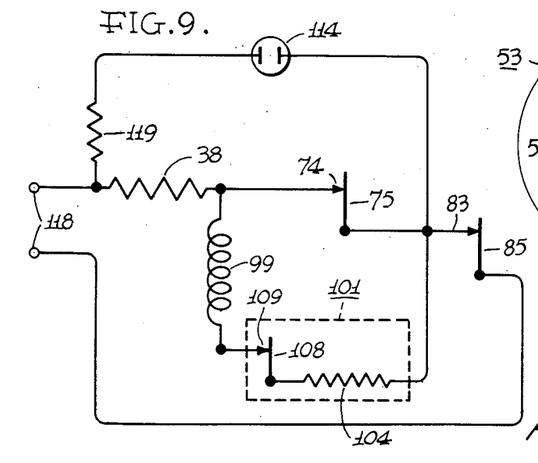
Fig. 9 is a diagrammatic illustration of the electrical circuit.

Referring now to the electrical circuit as shown in Fig. 9, it will be noted that the switch 83, 85 controls the energization of the apparatus from the supply terminals 118, and it will also be noted that the solenoid 99 and the thermal timer 101 are serially connected in a branch circuit in parallel with the switch 74, 75. The glow lamp 114 is connected as shown in a branch circuit which also includes a current-limiting resistor 119.

Figure 7:
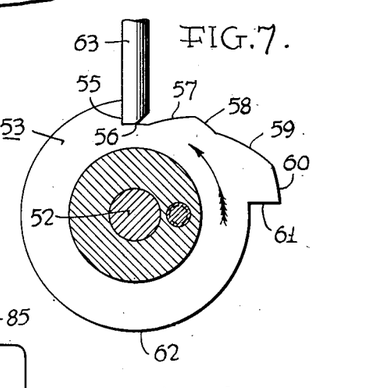
Fig. 7 is a detail sectional view taken along line 7—7 of Fig. 2.

In the non-operative condition of the apparatus, the knob 51 is in the "off" position (Fig. 3), cam 53 is in the position of Fig. 7 and the rod 63 is in its lowermost position with its lower end engaging flat 56 of the cam. Switch 83, 85 is held open by the arm 88 on rod 63. Switch 74, 75 is closed.

The operation of the apparatus may best be explained by describing a hypothetical cooking operation. Suppose, for example, that it is desired to perform a cooking operation which requires cooking of the contents of the pressure cooker for 15 minutes under a 15 pound pressure. With the pressure cooker 1 removed from the control mechanism, the user places the food material to be cooked in the cooker and otherwise prepares the cooker for the cooking operation in the customary manner. The cooker is then placed on the base 29 as shown in Figs. 1 and 2, the upper end 28 of the valve stem being brought into engagement with the extending finger 72 of the lever 67. It should be noted that this does not actuate the lever 67.

In the case assumed, the user rotates the control knob 51 in a clockwise direction, as indicated by the arrow in Fig. 3, until the numeral "15" is aligned with the index mark 50 on the plate 49. The consequent rotation of shaft 52 causes rotation of the cam 53 in the direction of the arrow shown in Fig. 7. During initial movement of the cam, the rod 63 is caused to rise onto the flat 58 and the consequent upward movement of the rod causes switch 83, 85 to close. Continued rotation of the cam causes the rod 63 to rise onto the flat 60 and then drop over shoulder 61 onto the portion 62 of the cam. The momentary lifting of the rod caused by the rise 59 and flat 60 of the cam effects momentary opening of the switch 74, 75 through actuation of lever 73, but this has no purpose in the operation under discussion. The reason for having the rise 59 and flat 60 on the cam is to enable non-automatic operation of the apparatus, as described later. It will be noted that Figs. 2 and 4 show condition of the apparatus when the rod 63 has dropped onto portion 62 of the cam, prior to further rotation of the cam to the desired setting.

With the rod 63 resting on the circular portion 62 of the cam, both of the switches 83, 85 and 74, 75 are closed. As may be seen in Fig. 9, the closure of switch 83, 85 energizes the glow lamp 114 which indicates to the user that the apparatus is in operation. With the switch 74, 75 closed, the solenoid 99 and thermal timer 101 are effectively short-circuited, and full energizing current is supplied to the heating element 38 which may be assumed to be a 1200 watt unit. While a small amount of current flows through the branch circuit of the lamp 114, it is insignificant due to the high resistance of the branch circuit including the lamp and the current-limiting resistor 119.

With the apparatus in operation as above described, the pressure in the cooker 1 commences to rise and the air therein is released by the air-venting device 7, as above described. The upward movement of the air-venting member 10 indicates to the user that the pressure is rising. It will be remembered that the stem and piston of the valve 8 are normally in the dot-and-dash position shown in Fig. 8. As the pressure within the cooker increases, the valve stem is urged upward by the pressure applied to shoulder 25 through the orifice 15 and the lower casing 14. This unseats the shoulder 25 of the valve stem from the orifice 19, and the steam pressure is then transferred to the substantially larger area of the lower surface of the piston 17. The resultant upward force is such that the piston 17 is moved rapidly upward, displacing the stem 18 to actuate the lever 67 and thus actuate lever 73 to open the switch 74, 75. Because of the clearance around the piston 17, the steam pressure rapidly becomes equal on both faces of the piston, resulting in a decrease in the upward force of the valve stem on the lever 67. The orifice 24 is larger than the lower orifice 19 by a predetermined amount and consequently the steam pressure on the lower face of the piston is sufficient to hold the shoulder 26 against the orifice 24 despite the spring 78 acting on the lever 67. The opening of switch 74, 75 initiates the timing cycle by removing the short-circuit from about the solenoid 99 and the thermal timer 101. The timing operation will be described presently.

As mentioned at the outset, it is one object of the present invention to initiate the timing cycle when the pressure in the cooker is somewhat less than the predetermined full cooking pressure. The force exerted on the valve stem 18 by the spring 78 of lever 73 is such that the piston 17 will be maintained in its normal lowermost position until the pressure in the cooker approaches the predetermined cooking pressure, e. g. 15 pounds per square inch, gauge. The forces exerted on the valve stem are such that an internal pressure of 11 pounds per square inch on the lower side of the piston will raise the valve stem against the force of spring 78. The actuation of lever 67 causes actuation of lever 73 to open the switch 74, 75. Thus, the timing cycle is initiated when the pressure in the cooker reaches 11 pounds per square inch. The plate 22 held in engagement with the upper edge of the valve casing 11 by spring 23, but the pressure exerted by this spring is such that when the pressure in the cooker exceeds 15 pounds per square inch, it causes the plate 22 to rise, thus venting some of the steam until the pressure is reduced to 15 pounds per square inch. In this manner, the pressure in the cooker is prevented from rising above the desired cooking pressure.

With the switch 74, 75 held open by the pressure in the cooker, as above described, the thermal timer 101 operates to effect intermittent opening and closing of the switch 108, 109 as previously described. The opening and closing of switch 108, 109 effects intermittent energization of the solenoid 99 and the heating element 38.

The intermittent energization of the solenoid 99 effects step-by-step movement of the cam 53 in the direction of the arrow in Fig. 7, through the medium of ratchet 54. Remembering that the cam 53 was adjusted through the medium of control knob 51 to bring the circular portion 62 of the cam into engagement with rod 63, the step-by-step movement of the cam in the direction of the arrow in Fig. 7 causes the lower end of rod 63 to ride on the circular portion 62 until the rod encounters the shoulder 55 and drops onto the flat 56, which terminates the timed cooking period by opening switch 83, 85.

During the timed cooking operation, the heating element 38 is intermittently energized as above mentioned. As previously pointed out, the heat input required to maintain boiling in the pressure cooker is considerably lower than the heat input required to rapidly raise the cooker and its contents to boiling temperature. The intermittent energization of the heating element 38 supplies the desired lower heat input. Assuming that the capacity of the heating element 38 is 1200 watts, when the switch 108, 109 is closed, the heating element is energized substantially at its rated capacity since the combined impedance of the solenoid 99 and the thermal timer 101 is so small in comparison to the resistance of the heating element that there is very little reduction in current. By way of example, it may be assumed that the switch 108, 109 is closed only during one-sixth of the time of a complete operating cycle of the thermal timer 101. This means that the heating element 38 is energized only one-sixth of the time during the complete cooking operation, and therefore the average input to the heating element is only one-sixth of its rated capacity. Thus, the average input would be 200 watts. Consequently, the heat supplied to the pressure cooker and its contents during the cooking operation would be one-sixth of that supplied during the heating-up period.

As above mentioned, the rod 63 drops onto the flat 56 of cam 53 (see Fig. 7) at the end of the timed cooking period. This does a number of things. The shoulder 82 on the top of the rod 63 pulls the levers 67 and 73 downward, depressing the valve stem 18 and consequently depressing the piston 17. The arm 88 on said rod opens the switch 83, 85 which deenergizes the apparatus and extinguishes the lamp 114, as may be seen from Fig. 9. The dropping of the rod 63 also effects closure of switch 74, 75 but this has no effect in view of the opening of switch 83, 85.

The depression of the valve stem 18 cracks the contact of shoulder 26 on the seat at orifice 24, and this reduces the pressure on the upper face of the piston 17, permitting steam to flow from the cooker through the valve casing and around the piston. This reduction in pressure on the upper face of the piston produces a pressure differential between the upper and lower faces thereof, which results in an upward force on the valve stem 18. This force tends to reseat the shoulder 26, but in moving toward the seating position, the venting of steam is reduced, and the upward force on the piston 17 is maintained in balance with the force of springs 64 and 78 when the steam is venting at the correct rate. Thus the rate of venting is determined by the combined downward force exerted on the valve stem by the springs 64 and 78 acting through the levers 67 and 73. As the pressure in the cooker decreases, a wider opening is required to maintain the balance of forces, and so the volume of steam is maintained substantially constant until a very low pressure is reached in the vessel.

During the venting, steam flows into and through the passage 116 which conducts the steam to the outlet 117 at the base 29 where it is diffused. As the steam enters the funnel-like entrance of the passage 116, it draws considerable air with it, and since the outlet 117 is located adjacent the heater ring 35 and the bottom of the cooker 1, there is a cooling effect on the heater ring and the bottom of the cooker. This increases the rate at which the pressure drops in the cooker by effecting a more rapid reduction of temperature therein. It should be noted further that the direction and diffusion of the steam keeps it away from the user, and also prevents any high velocity steam from coming into contact with walls or other surfaces which it might damage.

When the lever 67 was raised by the steam pressure, as hereinbefore described, the member 67a was free to assume a vertical position above the valve under the influence of gravity. The depression of lever 67 to effect venting brings member 67a into engagement with the top of the valve, and said member prevents lever 67 from forcing shoulder 25 to seat on opening 19 as the pressure in the cooker decreases. This enables the pressure in the cooker to be reduced substantially to atmospheric pressure. As the pressure in the cooker decreases to atmospheric pressure, the venting ceases and the air-venting member 10 drops. The user can then safely remove the lid of the cooker.

It should be noted that the only purpose of member 67a is that just described, and this member must not be of such length that it would interfere with the venting action or the dropping of rod 63 sufficiently to open switch 83, 85.

It will be apparent from the foregoing description that the thermal timer 101 is an important device in the apparatus as shown, as it controls the timing of the cooking operation and it also controls the average energization of the heating element 38 during the cooking operation. Reference is now made specifically to Fig. 5 wherein the thermal timer is shown. The adjustable set screws 105 and 113 enable accurate adjustment of the thermal timer both to adjust the average wattage input to the heater 38 and to adjust the timing rate by adjusting the length of the cycle period. Adjustment of the set screw 105 varies the temperature which the bimetal element 103 must attain and therefore the amount of flexing of this element required to effect opening of the contacts 108 and 109 by the overcenter spring 111. The adjustment of this screw also affects the temperature at which the bimetal permits the switch to close and thus generally may be considered as affecting the temperature level at which the thermal timer operates. The position of the set screw 113 determines the degree of separation of the contacts 108 and 109 when they are opened by the over-center spring 111, since the set screw 113 acts as a stop for the resilient contact finger 107. Adjustment of the set screw 113 varies the amount of movement of the bimetal element 103, during cooling thereof, which is necessary to cause the overcenter spring to close the contacts. The adjustment of screw 113 thus changes the differential between the temperature at which the bimetal 103 opens contacts 108 and 109 and the temperature of the bimetal which permits contacts 108 and 109 to close.

The two adjusting screws 105 and 113, arranged in the manner described above, greatly simplify the problem of accurately adjusting the thermal timer in the factory to give the desired timing action and the desired energy input to the heating element 38. It has been found that the number of trial and error adjustments can be minimized by following the simple procedure of, first, adjusting screw 105 until the input is correct and, secondly, of following this operation by adjustment of the screw 113 to bring the time cycle to its correct value. By performing the adjustments in this order, it is found that the adjusting of screw 113 has little or no effect on the average wattage input. Thus if it were observed that the input were too high, turning screw 105 in the clockwise direction would effect a decrease in the input with a resultant increase in the cycle time. A subsequent adjustment of screw 113 in the clockwise direction would decrease the cycle time with little and, in most cases, no effect on the previously adjusted input. The cycle period of the thermal timer 101 is preferably 30 seconds, and the time of energization of the heating element during each cycle of the thermal timer is preferably 5 seconds.

An additional feature of the thermal timer is its ability to compensate for changes of heat output of the heating element due to changes in line voltage. This may be seen with the aid of Fig. 11 which is a graphic illustration of the operation of the thermal timer. In this illustration, the temperature of the bimetal element is taken as the ordinate while time is taken as the abscissa. The horizontal dot and dash line 120 represents the temperature at which the contacts open, while the dot and dash line 121 represents the temperature at which the contacts close. The solid line curve 122 shows the operation for the normal voltage, i. e. 110 volts. This curve indicates that the "on" and "off" periods are 5 seconds and 25 seconds, respectively. The curve also shows that the temperature of the bimetal element overshoots the line 120 before cooling of said element commences. This is due to storage of heat in the heater associated with said element.

Figure 11:
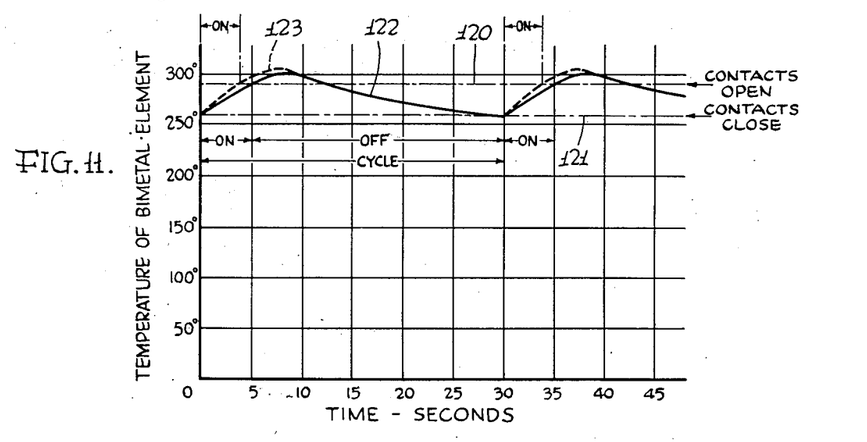
Fig. 11 is a graphic illustration of the operation of the thermal timer for different voltages.

Now assume that the voltage rises to 120 volts. This will cause a greater heat output from the heating element 38. But the thermal timer compensates for this by decreasing the "on" period. As shown in Fig. 11, when the voltage increases to 120 volts, the temperature of the bimetal element rises along the dashed line curve 123 which has a greater slope than the rising portion of curve 122. Hence the "on" time is decreased because the temperature of the bimetal element rises more quickly to the "open" line 120. Moreover, the temperature overshoot is greater and this causes the cooling portion of the new curve to coincide with the old curve. Therefore the cycle time remains constant.

In the case supposed, the "on" time is reduced from 5 seconds to about 4.2 seconds. It can be shown by simple calculation that such reduction of the "on" time will maintain the heat output of the heating element 38 constant, and this has been demonstrated by actual tests.

A further feature of the apparatus is the provision therein for accurate setting and operation of the timing means for short-time cooking periods. As previously mentioned, certain tender vegetables have rather short cooking periods for which the timing means should be accurately set. As may be seen in Fig. 3, the time graduations on the control knob 51 are more widely spaced for short cooking times than for long cooking times, the spacing of the graduations progressively diminishing as the cooking time increases. As may be seen in Fig. 4 the teeth of ratchet 54 are variously spaced from the center thereof, the radial distance of the teeth diminishing from one end of the toothed portion of the ratchet to the other end thereof. As the ratchet 54 is rotated in the direction of the arrow in Fig. 4 by the pawl 90, the stepping increments become greater due to the decreasing radial distance of the teeth from the center of the ratchet. Thus, the shape of the ratchet compensates for the relatively wide spacing of the short-time graduations of knob 51.

Figures 10, 12:
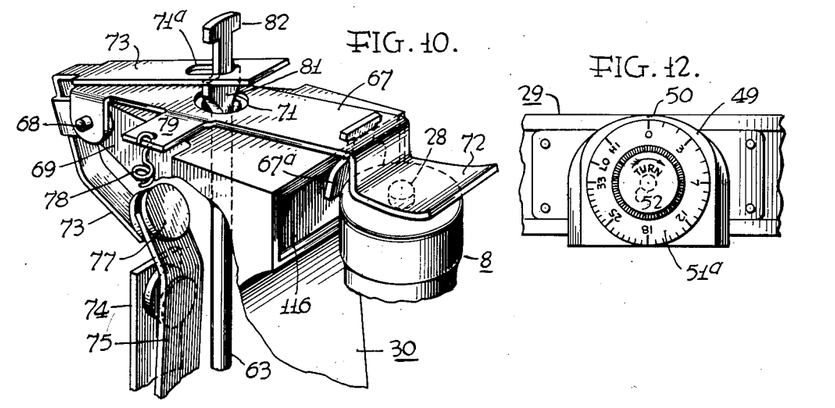
Fig. 10 is a fragmentary perspective view, on a relatively large scale, of the upper part of the control mechanism.
Fig. 12 is a face view of a modified form of the indicia-containing control knob.

The above result may be accomplished by a different arrangement of the time graduations on the control knob, as shown in Fig. 12. Instead of having the principal graduations differently spaced, as in Fig. 3, they may be evenly spaced but may be made to represent different time intervals, as in Fig. 12. Thus, in Fig. 12 the main graduations of knob 51a are evenly spaced, but they represent periods of 3, 4, 5, 6, 7 and 8 minutes, respectively, the spaces between those graduations being subdivided accordingly. No other modification of the apparatus is necessary. In this instance, the increasing stepping increments of the ratchet 54 compensate for the decreasing time intervals represented by the main graduations of knob 51a.

The foregoing description has been with reference to automatic operation of the apparatus. As previously mentioned, the cam 53 is designed to enable non-automatic operation of the apparatus. The user may apply heat to a cooking vessel at a high or low rate by adjusting the knob 51 (see Fig. 3) to the "HI" or "LO" position. If the knob is rotated to the "HI" position, the rod 63 rides onto the flat 59 of cam 53 (see Fig. 7), effecting closure of switch 83, 85 which energizes the heating element 38, as may be seen in Fig. 9. With the knob in this position, switch 74, 75 is closed and the heating element is continuously energized to give full heat. By rotating the knob 51 to the "LO" position, the user is enabled to effect heating of the cooking vessel at a low rate. Such adjustment of the knob 51 causes the rod 63 to ride up onto the flat 60 of cam 53, and the shoulder 81 on said rod actuates lever 73 (see Fig. 10) and causes the switch 74, 75 to be opened. As will be apparent from the foregoing description, this causes intermittent energization of the heating element 38 through the action of the thermal timer 101. However, in this instance, there is no timing action performed because the smooth portion of the ratchet 54 is in engagement with the pawl 90 and consequently there is no stepping action. While the solenoid 99 is intermittently energized and the pawl 90 is repeatedly actuated, the ratchet remains stationary.

If the pressure cooker 1 is employed, the user may heat the cooker rapidly at high rate and then reduce the heating rate, by manipulation of knob 51. At the end of the cooking time, the user may turn the knob to "off," causing venting to take place as in the case of automatic operation.

It should be noted, however, that the contents of any cooking vessel may be heated at high or low rate by adjustment of the knob 51. Of course, in the case of an ordinary cooking vessel, there will be no venting action when the knob is turned to "off" position.

Figure 13:
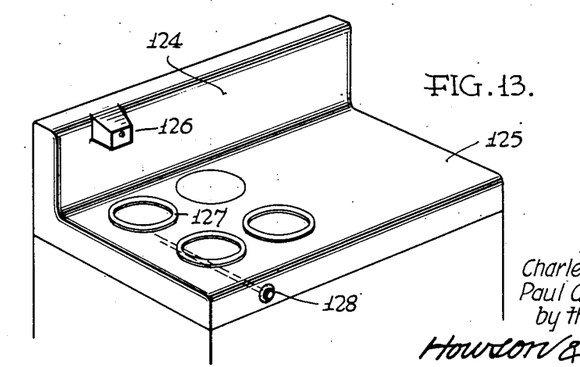
Fig. 13 is a perspective view illustrating the incorporation of the apparatus in an electric range.

If desired, the control mechanism may be built into an electric range as illustrated in Fig. 13. Thus the control mechanism may be built into the back guard 124 of an electric range 125, the back guard having a projecting hood 126 under which the valve of the pressure cooker is inserted when the cooker is placed on the heating element 127. It will be understood that the control mechanism shown in Figs. 2 and 4 is, in this instance, housed within the back guard 124, and the lever 67 extends into the hood 126 for engagement by the valve stem on the cooker. The control shaft may extend to the front of the range where the control knob 128 is located.

While a particular form of the invention has been illustrated and described, it will be apparent that the invention is not limited thereto but is capable of various modifications and other embodiments.

We claim:

1. In an apparatus for controlling the operation of a pressure cooking vessel, electrical heating means for heating said vessel, a current-operable thermostatic switch device connected in circuit with said heating means so as to effect intermittent energization of said heating means, whereby to reduce the heat output of said heating means, a normally closed switch connected in parallel with said device, thus normally short-circuiting said device, and means for opening said switch to render said device operable when the pressure in said vessel has reached a predetermined value.

2. Apparatus for effecting timed energization of an electrical heating means at a predetermined average rate, comprising an electrically-operable timer mechanism characterized in that it is operable by intermittent energization in regularly occurring successive energization intervals, and common means for effecting the aforementioned intermittent energization both of said heating means and said timer mechanism, whereby to effect energization of said heating means at a certain average rate and also to actuate said timer mechanism.

3. Apparatus for effecting timed energization of an electrical heating means at a predetermined average rate, comprising an electrically-operable timer mechanism characterized in that it is operable by intermittent energization in regularly occurring successive energization intervals, and common means comprising a current-operable thermostatic switch device having a heater in series with said heating means for effecting the aforementioned intermittent energization both of said heating means and said timer mechanism, whereby to effect energization of said heating means at a certain average rate and also to actuate said timer mechanism.

4. Pressure cooking apparatus, comprising a pressure cooking vessel, means for heating said vessel, manually-operable means for energizing said heating means and for setting the time for a desired cooking operation, means including a current-operable device for effecting intermittent energization of said heating means and for controlling the timing of the cooking operation, a switch adapted to render said device initially inoperative, means for actuating said switch to render said device operative when the pressure in said vessel has reached a predetermined value less than full cooking pressure, thereby to initiate a timed cooking operation during which said heating means has a reduced heat output due to the intermittent energization thereof, and means for interrupting the energization of said heating means at the end of the timed cooking operation.

5. Apparatus according to claim 2, including a mechanism for effecting intermittent energization of said heating means in successive cycles of equal time duration, and manually-adjustable means on said mechanism for varying the average rate of energization of said heating means and for varying the time duration of each operating cycle.

6. In an apparatus for controlling the operation of a pressure cooking vessel, electrical heating means for heating said vessel, a current-operable device adapted to effect intermittent energization of said heating means, whereby to reduce the heat output of said heating means, a normally closed switch connected in parallel with said device, thus normally short-circuiting said device, and means selectively operable by the user either to open said switch or to maintain it closed, whereby the user may effect either intermittent or continuous energization of said heating means.

7. Pressure cooking apparatus including a control mechanism and a pressure cooking vessel separable from said mechanism, said apparatus comprising a pressure cooking vessel, electrical means for heating said vessel, manually-operable means for energizing said heating means substantially at its full wattage and for setting the time for a desired cooking operation, means for timing the cooking operation, means for effecting intermitent energization of said heating means so as to reduce the average wattage input thereto sufficiently to maintain full cooking pressure in said vessel during the cooking operation, means for starting operation of the last-recited means in response to a predetermined pressure in said vessel less than full cooking pressure so as to reduce overshoot of the pressure and temperature of the vessel and thus minimize loss of steam from the vessel, means for venting any excess pressure from said vessel above the cooking pressure during the cooking operation, means for interrupting the energization of said heating means at the end of the timed cooking operation, and means for venting steam from said vessel at a rapid rate after termination of the cooking operation so as to reduce the pressure in said vessel.

8. Apparatus for effecting timed energization of an electrical heating means at a predetermined average rate, comprising circuit means including a switch for energizing said heating means, a timer, means controlled by said timer for opening said switch at the end of a time interval, said timer including ratchet means and a solenoid operatively associated therewith for actuating the ratchet means in response to repeated energization of the solenoid, and a current-operable thermostatic switch device in circuit with said heating means and said solenoid to effect intermittent energization both of the heating means and the solenoid.

9. Pressure cooking apparatus, comprising a pressure cooking vessel, means for heating said vessel, manually-operable means for energizing said heating means and for setting the time for a desired cooking operation, means including a current-operable device for effecting intermittent energization of said heating means and for controlling the timing of the cooking operation, means adapted to render said device initially inperative, means for actuating said last-recited means to render said device operative when the pressure in said vessel has reached a predetermined value, thereby to initiate a timed cooking operation during which said heating means has a reduced heat output due to the intermittent energization thereof, and means for interrupting the energization of said heating means at the end of the timed cooking operation.

10. Pressure cooking apparatus, comprising a pressure cooking vessel, means for heating said vessel, manually-operable means for energizing said heating means and for setting the time for a desired cooking operation, means including a current-operable device for effecting intermittent energization of said heating means and for controlling the timing of the cooking operation, a switch adapted to render said device initially inoperative, means for actuating said switch to render said device operative when the pressure in said vessel has reached a predetermined value, thereby to initiate a timed cooking operation during which said heating means has a reduced heat output due to the intermittent energization thereof, and means for interrupting the energization of said heating means at the end of the timed cooking operation.

11. In an apparatus for controlling the operation of a pressure cooking vessel, electrical heating means for heating said vessel, a current-operable thermostatic switch device connected in circuit with said heating means so as to effect intermittent energization of said heating means, whereby to reduce the heat output of said heating means, a normally closed switch connected in parallel with said device, thus normally short-circuiting said device, and means for opening said switch to render said device operable when the pressure in said vessel has reached a predetermined value less than full cooking pressure.

12. In an apparatus for controlling the operation of a pressure cooking vessel, electrical heating means for heating said vessel, a current-operable thermostatic switch device connected in circuit with said heating means so as to effect intermittent energization of said heating means, whereby to reduce the heat output of said heating means, timing means operable by said device to time a cooking operation, a normally closed switch connected in parallel with said device, thus normally short-circuiting said device, and means for opening said switch to render said device operable and to initiate operation of said timing means when the pressure in said vessel has reached a predetermined value.

13. In an apparatus for controlling the operation of a pressure cooking vessel, electrical heating means for heating said vessel, a current-operable thermostatic switch device connected in circuit with said heating means so as to effect intermittent energization of said heating means, whereby to reduce the heat output of said heating means, timing means operable by said device to time a cooking operation, said timing means comprising a ratchet and an operating solenoid therefor, said solenoid being included in circuit with said switch device so as to be repeatedly energized during operation of said device, a normally closed switch connected in parallel with said device, thus normally short-circuiting said device, and means for opening said switch to render said device operable and to initiate operation of said timing means when the pressure in said vessel has reached a predetermined value.

14. In a pressure cooking apparatus, a pressure cooking vessel, electrical heating means for heating said vessel, circuit means for energizing said heating means substantially at its full wattage to effect rapid initial heating of the vessel and consequent rapid rise of pressure therein, means adapted when operable to effect cyclic intermittent energization of said heating means so as to provide a predetermined lower average wattage input to said heating means, whereby to produce a predetermined lower average heat output from said heating means, means for rendering said intermittent energization means initially inoperative, means responsive to the pressure in said vessel for actuating said last-recited means to render said intermittent energization means operable at a predetermined pressure, and means for venting any excess pressure from said vessel above the cooking pressure during the cooking operation.

15. In a pressure cooking apparatus, a pressure cooking vessel, electrical heating means for heating said vessel, circuit means for energizing said heating means substantially at its full wattage to effect rapid initial heating of the vessel and consequent rapid rise of pressure therein, a current-operable thermostatic switch device connected in circuit with said heating means and adapted when operable to effect cyclic intermittent energization of said heating means so as to provide a predetermined lower average wattage input to said heating means, whereby to produce a predetermined lower average heat output from said heating means, means for initially deenergizing said device, means responsive to the pressure in said vessel for actuating said last-recited means to energize said device when the pressure in said vessel has reached a predetermined value less than full cooking pressure, whereby the cyclic operation of said device commences with an "on" cycle during which said heating means is energized, and means for venting any excess pressure from said vessel above the cooking pressure during the cooking operation.

16. In a pressure cooking apparatus, a pressure cooking vessel, electrical heating means for heat in said vessel, circuit means for energizing said heating means substantially at its full wattage to effect rapid initial heating of the vessel and consequent rapid rise of pressure therein, means adapted when operable to effect cyclic intermittent energization of said heating means so as to provide a predetermined lower average wattage input to said heating means, whereby to produce a predetermined lower average heat output from said heating means, means adapted when operable to time a cooking operation, means for rendering said intermittent energization means and said timing means initially inoperative, means responsive to the pressure in said vessel for actuating said last-recited means to render said intermittent energization means and said timing means operable simultaneously at a predetermined pressure, means for venting any excess pressure from said vessel above the cooking pressure during the cooking operation, means for interrupting the energization of said heating means at the end of the timed cooking operation, and means for venting the pressure in said vessel at a rapid rate after termination of the cooking operation so as to reduce the pressure in said vessel.

17. Apparatus according to claim 16, wherein said pressure-responsive means renders said intermittent energization means and said timing means operable simultaneously at a predetermined pressure less than full cooking pressure.

18. In a pressure cooking apparatus, a pressure cooking vessel, electrical heating means for heating said vessel, circuit means for energizing said heating means substantially at its full wattage to effect rapid initial heating of the vessel and consequent rapid rise of pressure therein, a current-operable thermostatic switch device in circuit with said heating means and adapted when operable to effect cyclic intermittent energization of said heating means so as to provide a predetermined lower average wattage input to said heating means, whereby to produce a predetermined lower average heat output from said heating means, means adapted when operable to time a cooking operation, said timing means including a ratchet and an operating solenoid therefor connected in circuit with said device for operation thereby, manual means for setting said timing means according to the cooking time desired, means for rendering said intermittent energization means and said timing means initially inoperative, means responsive to the pressure in said vessel for actuating said last-recited means to render said intermittent energization means and said timing means operable simultaneously at a predetermined pressure, means for venting any excess pressure from said vessel above the cooking pressure during the cooking operation, means for interrupting the energization of said heating means at the end of the timed cooking operation, and means for venting the pressure in said vessel at a rapid rate after termination of the cooking operation so as to reduce the pressure in said vessel.

19. Apparatus for effective timed energization of an electrical heating means at a predetermined average rate comprising a manually rotatable control knob adapted for manual movement between an "off" position and a time-indicating position, cam means arranged for rotatable movement with said control knob, a cam follower for controlling the energization of said heating means in accordance with a prescribed program on said cam means, circuit means including switch means for energizing said heating means in response to movement of said follower, a timer mechanism for advancing said cam means and said control knob to the "off" position, whereby the position of said knob will indicate the period of time remaining for the completion of the operation, said timer including current-operated thermostatic switch means operable through successive cycles of substantially equal time duration, a solenoid in circuit with said thermostatic switch means and adapted to be correspondingly cyclically energized and deenergized, a pivotally mounted plunger movable by said solenoid between a solenoid-energized position and a non-energized position, said plunger being biased toward said non-energized position, a pawl operatively associated with said plunger, and a ratchet member arranged for rotatable movement with said cam means and said control knob, the rotatable members being moved in incremental steps by the action of said pawl on said ratchet through movement of said plunger to the solenoid-energized position.

20. Apparatus for control of a pressure cooking vessel, comprising a control mechanism having a manual control means for selecting an automatically timed pressure cooking operation or for selecting a non-automatic operation at any one of a number of heats, electrical heating means in circuit with and adapted to be controlled by said control mechanism, said mechanism including a current-operable device for effecting intermittent energization of said heating means, means governing the operation of said device and adapted to render said device initially inoperative, said vessel and mechanism being separable but having interengaging parts whereby an increase in pressure in said vessel to a predetermined value during automatic operation of said apparatus will effect actuation of said governing means to cause operation of said device and thus reduce the heat output from continuous energization of said heating means to a reduced predetermined average wattage, and means under control of the manual means selectively operable by the user for effecting non-automatic operation either with continuous energization of said heating means or with intermittent energization thereof by said device through actuation of said governing means.

21. Apparatus for control of a pressure cooking vessel, comprising a structure including a horizontal portion and a vertical portion, a control mechanism within said vertical portion having a manual control means for selecting an automatically timed pressure cooking operation or for selecting a non-automatic operation at any one of a number of heats, electrical heating means on said horizontal portion in circuit with and adapted to be controlled by said control mechanism, said mechanism including a current-operable device for effecting intermittent energization of said heating means, means governing the operation of said device and adapted to render said device initially inoperative, said vessel and mechanism being separable but having interengaging parts whereby an increase in pressure in said vessel to a predetermined value during automatic operation of said apparatus will effect actuation of said governing means to cause operation of said device and thus reduce the heat output from continuous energization of said heating means to a reduced predetermined average wattage, and means under control of the manual means selectively operable by the user for effecting non-automatic operation either with continuous energization of said heating means or with intermittent energization thereof by said device through actuation of said governing means.

22. Apparatus for control of a pressure cooking vessel, comprising a structure including a horizontal portion and a vertical portion, a control mechanism within said vertical portion having a manual control means for selecting an automatically timed pressure cooking operation or for selecting a non-automatic operation at any one of a number of heats, electrical heating means on said horizontal portion in circuit with and adapted to be controlled by said control mechanism, said mechanism including a current-operable device for effecting intermittent energization of said heating means, a timer arrangement including a ratchet member arranged for movement with said manual means and a solenoid-operated pawl therefor, said solenoid being intermittently energized by said current-operable device, means governing the operation of said device and adapted to render said device initially inoperative, said vessel and mechanism being separable but having interengaging parts whereby an increase in pressure in said vessel to a predetermined value during automatic operation of said apparatus will effect actuation of said governing means to cause operation of said device and thus reduce the heat output from continuous energization of said heating means to a reduced predetermined average wattage, and means under control of the manual means selectively operable by the user for effecting non-automatic operation either with continuous energization of said heating means or with intermittent energization thereof by said device through actuation of said governing means, said ratchet member having a smooth surface disposed adjacent said pawl during non-automatic operation so that actuation of the pawl by intermittent energization of the solenoid will not cause advance of said manual means.

23. Apparatus for automatic control of pressure cooking, comprising a pressure cooker equipped with a pressure operable valve having a single movable projecting element movable in one direction in response to increase of pressure within the cooker to transmit pressure intelligence externally of the cooker and movable in the opposite direction by an external force acting against the cooker pressure to vent the cooker, a structure including a horizontal portion and a vertical portion, an electrical heating unit on said horizontal portion to heat said cooker when the latter is placed thereon, means for energizing said heating unit substantially at its full wattage to effect rapid initial heating of the cooker and consequent rapid rise of pressure therein, means adapted when operable to effect cyclic intermittent energization of said heating unit so as to provide a predetermined lower average wattage input to said heating unit, whereby to produce a lower average heat output from said heating unit, means for rendering said intermittent energization means initially inoperative, a spring-biased feeler element on said vertical portion engageable by said projecting element and operable by movement thereof in the first-mentioned direction in response to the attainment of a predetermined pressure in said cooker to actuate said last-recited means to render said intermittent energization means operable, and means operable at the end of the cooking operation to cause said feeler element to apply a force to said projecting element in the second-mentioned direction to vent the cooker.

24. Apparatus for automatic control of a pressure cooker equipped with a pressure operable valve having a single movable projecting element to enable venting of the cooker and for transmitting pressure intelligence from within said cooker, comprising a structure including a horizontal portion and a vertical portion, an electrical heating unit on said horizontal portion to heat said cooker when the latter is placed thereon, manual means for initiating energization of said heating means substantially at its full wattage to effect rapid initial heating of the cooker and for presetting the time duration of the cooking operation, a cam arranged for movement with said manual means, a cam follower operable by said cam to control energization of said heating means, a timer mechanism for advancing said manual means and cam, means adapted when operable to provide a predetermined lower wattage input to said heating unit, means for rendering said reduced energization means initially inoperative, a feeler element pivotally mounted on said vertical portion engageable by said projecting element and operable thereby to actuate said last-recited means, said feeler element being spring biased against said projecting element to provide a predetermined resistance to movement thereof, whereby attainment of a predetermined pressure in said cooker is necessary for actuation of said last-recited means to render said reduced energization means operable, and means providing a substantially higher spring bias on said feeler element in response to movement of said cam follower into the off position of said control cam at the end of the timed operation whereby pressure is vented from said valve, said last-mentioned means being effective to bias said cam follower against said cam.

25. Apparatus for automatic control of a pressure cooker equipped with a pressure operable valve having a single movable projecting element to enable venting of the cooker and for transmitting pressure intelligence from within said cooker, electrical heating means adapted to provide the heat energy for the cooking operation, manual means for initiating energization of said heating means at its full wattage to effect rapid initial heating of the cooker and for presetting the time duration of the cooking operation, a cam arranged for movement with said manual means, a cam follower operable by said cam to control energization of said heating means, a timer mechanism for advancing said manual means and cam, means for reducing the input to said heating means, a feeler element pivotally mounted on said apparatus engageable by said projecting element and operable thereby to actuate said last-recited means, said feeler element being spring biased against said projecting element to provide a predetermined resistance to movement thereof, whereby attainment of a predetermined pressure in said cooker effects actuating of said last-recited means to reduce the input to said heating means, and means providing a substantially higher spring bias on said feeler element in response to movement of said cam follower into the off position of said control cam at the end of the timed operation whereby pressure is vented from said valve, said last-mentioned means being effective to bias said cam follower against said cam.

26. Pressure cooking apparatus, comprising a vessel adapted to cook food under steam pressure, heating means for heating said vessel, venting means on said vessel including an outlet to vent steam therefrom at the end of a cooking operation, and structure forming a passageway having an inlet adjacent to said outlet and open to the atmosphere and also having an outlet adjacent to said heating means, whereby steam emitted under pressure through the first-mentioned outlet enters said passageway and draws air with it, and the passageway directs the steam and air against the heating means to accelerate the cooling thereof and to diffuse the vented steam.

27. Apparatus for automatic control of pressure cooking, comprising a pressure cooker equipped with a pressure operable valve having a single movable projecting element movable in one direction in response to increase of pressure within the cooker to transmit pressure intelligence externally of the cooker and movable in the opposite direction by an external force acting against the cooker pressure to vent the cooker, a control stand to receive the cooker, means for heating the cooker, normally-inoperative means on the control stand to reduce the heat output of said heating means, a spring-biased feeler element on said control stand engageable by said projecting element and operable by movement thereof in the first-mentioned direction in response to the attainment of a predetermined pressure in said cooker, means operable by said feeler element to render said heat-reducing means operative, and means operable at the end of the cooking operation to cause said feeler element to apply a force to said projecting element in the second-mentioned direction to vent the cooker.

28. Apparatus according to claim 27, further comprising means for limiting the movement of said projecting element by the external force to effect venting of the cooker.

29. Apparatus for automatic control of pressure cooking, comprising a pressure cooker equipped with a pressure operable valve having a single movable projecting element movable in response to pressure increase within the cooker to transmit pressure intelligence externally of the cooker and also movable to vent the cooker, a control stand to receive the cooker, means for heating the cooker, means on the control stand to reduce the heat output of said heating means, a feeler element on said control stand compressively engageable with said projecting element, means operable by said feeler element to effect operation of said heat-reducing means, means for initially applying to said feeler element a force which must be overcome by the pressure within said cooker to effect operation of said heat-reducing means, and means operable at the end of the cooking operation to change the force on said feeler element to effect venting of the cooker by movement of said projecting element.

30. In an apparatus for control of a pressure cooking vessel, electrical means for heating said vessel, a current-operable device adapted to effect intermittent energization of said heating means, whereby to reduce the heat output of said heating means, switch means normally rendering said device inoperative, means responsive to pressure in said vessel for actuating said switch means to render said device operable when the pressure has reached a predetermined value, and means selectively operable by the user either to actuate said switch means or to maintain the same in normal position, thereby to effect either intermittent energization or continuous energization of said heating means so as to operate the same at different predetermined temperature levels.

CHARLES ROGER TURNER.
PAUL GARFIELD TURNER.

References Cited in the file of this patent

UNITED STATES PATENTS

| Number | Name | Date |
|---|---|---|
| 752,703 | Orndorf | Feb. 23, 1904 |
| 771,013 | Herdrich | Sept. 27, 1904 |
| 1,661,252 | Fricke et al. | Mar. 6, 1928 |
| 1,702,480 | Newsom | Feb. 19, 1929 |
| 1,745,420 | Hewitt | Feb. 4, 1930 |
| 1,756,787 | Goughnour | Apr. 29, 1930 |
| 1,950,115 | Kuenzli et al. | Mar. 6, 1934 |
| 2,023,118 | Biebel | Dec. 3, 1935 |
| 2,046,718 | Bletz | July 7, 1936 |
| 2,163,616 | McGihon | June 27, 1939 |
| 2,194,117 | Graham | Mar. 19, 1940 |
| 2,262,286 | Ireland | Nov. 11, 1941 |
| 2,269,973 | Hathaway | Jan. 13, 1942 |
| 2,281,319 | Newell | Apr. 28, 1942 |
| 2,369,932 | Allen | Feb. 20, 1945 |
| 2,392,635 | Bletz | Jan. 8, 1946 |
| 2,402,576 | Purpura | June 25, 1946 |
| 2,414,396 | Sardeson | Jan. 14, 1947 |
| 2,424,393 | Graves | July 22, 1947 |
| 2,425,164 | Thomson | Aug. 5, 1947 |
| 2,426,620 | Koci | Sept. 2, 1947 |
| 2,428,483 | Wittenberg | Oct. 7, 1947 |
| 2,468,996 | Olson | May 3, 1949 |
| 2,472,451 | Whitney | June 7, 1949 |
| 2,483,628 | Davis | Oct. 4, 1949 |
| 2,495,603 | Ryan | Jan. 24, 1950 |
| 2,515,879 | Korn | July 18, 1950 |
| 2,518,387 | Shaw | Aug. 8, 1950 |
| 2,563,563 | Swenson | Aug. 7, 1951 |